Dec. 13, 1927.

F. P. RYDER

GREEN PEA VINER

Filed Jan. 4, 1927

Inventor
Frank P. Ryder
By
Attorney

Dec. 13, 1927.

F. P. RYDER 1,652,498

GREEN PEA VINER

Filed Jan. 4, 1927

Inventor
Frank P. Ryder
By
Attorney

Patented Dec. 13, 1927.

1,652,498

UNITED STATES PATENT OFFICE.

FRANK P. RYDER, OF NIAGARA FALLS, NEW YORK.

GREEN-PEA VINER.

Application filed January 4, 1927. Serial No. 158,900.

My invention relates to green pea viners of the type in which an outer slowly rotating drum carrying longitudinal lifting ribs and an inner drum or cylinder within the outer drum and carrying beater arms is rotated at relatively high speed to cause its beater arms to act upon the pods carried by the pea vines as they are lifted and dropped by the outer drum to cause the pods to open and release the peas, such as is shown in United States Patent No. 500,299, to Chisholm and Scott, dated June 27, 1893, and my invention relates particularly to the improvement in this type of green pea viners disclosed in United States Patent No. 1,219,416, issued to me March 13, 1917, by which the beater arms carried by the inner drum or cylinder may be angularly adjustable. The object of my present invention is to provide means by which the angular position of the beater arms may be so indicated on the head of the inner drum or cylinder.

With the objects above indicated and other objects hereinafter explained in view my invention consists in the construction and combination of elements hereinafter described and claimed.

Referring to the drawings:—

Figure 3:
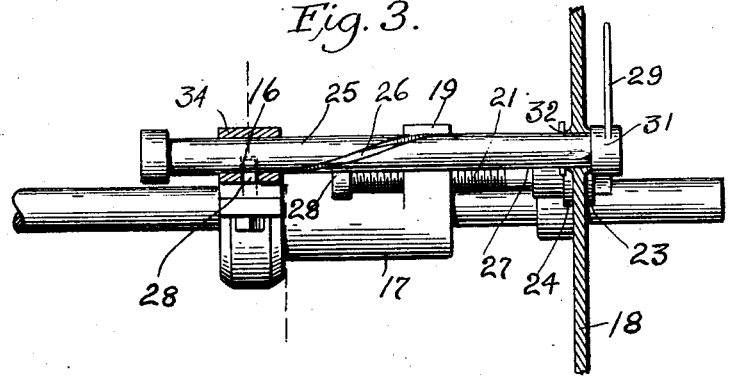

35 Figure 3 is a detail view partly in section showing means for operating the indicator.

Figure 1:
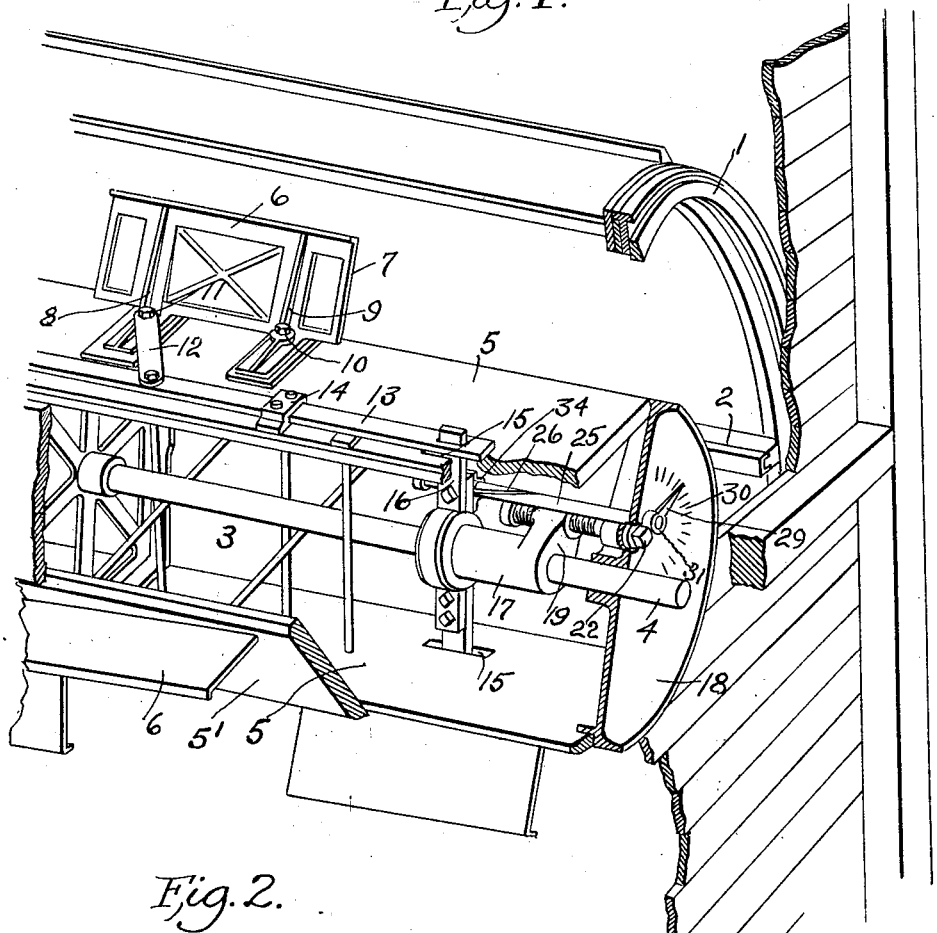
Figure 1 is a perspective view partly broken away of a green pea viner having the indicator of my present invention applied thereto.
Figure 2:
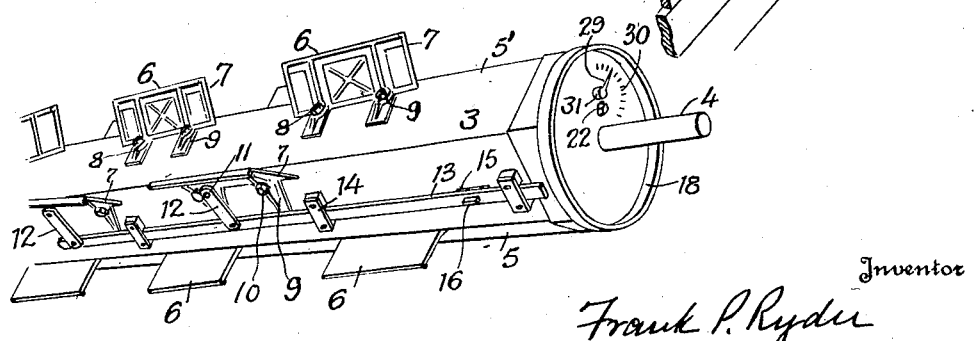
Figure 2 is a perspective view of the beater cylinder.
Figure 4:
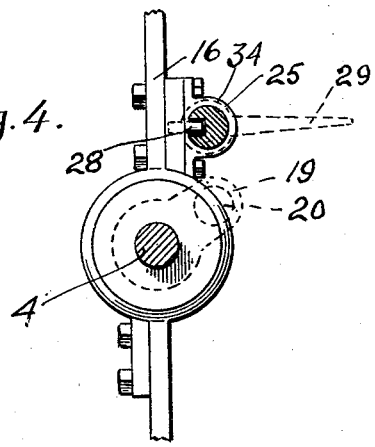

Figure 4 is an end view partly in section of the mechanism shown in Figure 2.

In the drawings 1 indicates the outer drum or cylinder of the green pea viner having longitudinal lifting ribs 2 and 3 indicates the inner drum or cylinder, mounted on the central shaft 4. This drum or cylinder is usually constructed as a hexagonal prism, the flat sides 5 and 5′ of which afford better surfaces for carrying the beater arms than would be afforded by the curved surfaces of a true cylinder, but commonly termed in the trade a cylinder.

The beater arms 6 each consists of a plate 7 carried by brackets 8 and 9. On four of the sides of the cylinder, indicated by 5′, the brackets 8 and 9 are secured to these sides 5′. On each of the two opposite sides 5 some or all of the beater arms are angularly adjustable. In order to provide for such adjustment the bracket 9 is pivoted at 10 to the side 5 and the bracket 8 is pivotally connected at 11 to one end of a link 12 the other end of which is pivotally connected to a slide 13 extending longitudinally of the side 5 to which it is held by guide 14 through which it slides freely. By longitudinal movement of slide 13 the link 12 will cause the beater arm to be swung on pivot 10 so as to change the angle of plate 7 relative to the axis of the drum or cylinder and to thereby modify the action of the beater arm upon the pea vines.

One longitudinal slide 13 is provided for each of the opposite sides 5 on which sliding beater arms 6 are carried so that the movement of each slide effects the angular adjustment of all of the beater arms connected to it. In order to effect simultaneous operation of the two slides 13 the sides 5 which carry them are each provided with a slot 15 through which extends the end of a cross bar 16 which is carried by a sleeve 17 movable on central shaft 4 and located near the end plate or head 18 which carries the sides 5 and 5′. This sleeve 17 is provided with an arm 19 having screw threaded opening 20 through its outer end parallel with shaft 4. Through this opening 20 extends screw threaded rod 21 the outer end of which extends through end plate or head 18 and is squared or made otherwise non-circular at 22 for a wrench. This screw threaded rod is held against longitudinal movement in the end of plate or head 18 by any convenient means as by an outer ring 23 and an inner ring 24 secured to the rod with the end plate between them. By rotating screw threaded rod 21 by a wrench applied to its end 22 the sleeve 17 will be moved and, through cross bars 16 and slides 13 and links 12, the several beater arms on sides 5 will be simultaneously angularly shifted.

The construction thus far described is substantially that of my Patent No. 1,219,416, above referred to.

In carrying out my present invention I secure to a moving element of the adjusting mechanism, preferably to a cross bar 16, by any convenient means, a bearing 34 adapted to receive a rod 25 and permit it to turn therein and to move longitudinally of the rod. The rod 25 extends through the head 18 and carries on its end a pointer arm 29. On the head 18 is marked a scale 30 over which the pointer arm 29 is carried by a base 31 secured on rod 25 outside the head 18 and serving to prevent movement of the rod in one direction while its movement in the other direction is prevented by a ring 32 on the inside of the head 18. The rod 25 is thus held against longitudinal movement while permitted to rotate freely. In this rod 25 is formed a helical groove 26 into which enters the end of a pin 28 carried by the bearing 34. As the cross bar 16 is moved in either direction by rotating screw 21 the pin 28 acts on the walls of the groove 26 to rotate rod 25 and to swing the pointer arm 29 over the scale 30 so as to indicate the angular position of the adjustable beater arms.

If desired, the beater arms, on more or less than two of the sides of the beater cylinder may be arranged to be adjustable and all, or only part of the beater arms on any one side of the beater cylinder may be arranged to be adjustable.

Having thus described my invention what I claim is:—

1. In a green pea viner of the type in which a beater cylinder is mounted to rotate within a rotatable cylinder reel provided interiorly with lifting ribs, beater arms so mounted on the beater cylinder as to be capable of angular adjustment, means for angularly adjusting the beater arms and an indicator arm carried by the beater cylinder and means operated by the beater adjusting mechanism for moving the indicator arm.

2. In a green pea viner of the type in which a beater cylinder is mounted to rotate within a rotatable cylinder reel provided interiorly with lifting ribs, beater arms so mounted on the beater cylinder as to be capable of angular adjustment, means for angularly adjusting a plurality of the beater arms simultaneously, and an indicator arm carried by the beater cylinder and means operated by the beater adjusting mechanism for moving the indicator arm.

3. In a green pea viner of the type in which a beater cylinder carried by a central shaft and having a head at one end is mounted to rotate within a rotatable cylinder reel provided interiorly with lifting ribs, beater arms so mounted on the beater cylinder as to be capable of angular adjustment and means for angularly adjusting a plurality of the beater arms simultaneously comprising a slide movable upon the central shaft of the beater cylinder, an indicator arm carried on the head of the beater cylinder and means operated by the adjusting mechanism for moving the indicator arm.

4. In a green pea viner of the type in which a beater cylinder carried by a central shaft and having a head at one end is mounted to rotate within a rotatable cylinder reel provided interiorly with lifting ribs, beater arms so mounted on the beater cylinder as to be capable of angular adjustment, means for angularly adjusting a plurality of the beater arms simultaneously comprising a slide movable upon the central shaft of the beater cylinder and a cross arm carried by the slide and an indicator arm carried by the cross arm of the adjusting mechanism for moving the indicator arm.

5. In a green pea viner of the type in which a beater cylinder carried by a central shaft and having a head at one end is mounted to rotate within a rotatable cylinder reel provided interiorly with lifting ribs, beater arms so mounted on the beater cylinder as to be capable of angular adjustment means for angularly adjusting a plurality of the beater arms simultaneously comprising a slide movable upon the central shaft of the beater cylinder, and an indicator arm carried on the head of the beater cylinder and means operated by the adjusting mechanism for moving the indicator arm comprising a rod carried by the indicator arm and having a helical groove formed in it and a pin carried by a movable element of the adjusting mechanism engaging the groove of said rod.

6. In a green pea viner of the type in which a beater cylinder carried by a central shaft and having a head at one end is mounted to rotate within a rotatable cylinder reel provided interiorly with lifting ribs, beater arms so mounted on the beater cylinder as to be capable of angular adjustment means for angularly adjusting a plurality of the beater arms simultaneously comprising a slide movable upon the central shaft of the beater cylinder and a cross arm carried by the slide, an indicator arm carried on the head of the beater cylinder and means operated by the cross arm of the adjusting means for moving the indicator arm comprising a rod carried by the indicator arm and having a helical groove formed therein, a bearing carried by the cross arm adapted to receive the rod and to permit it to rotate and move longitudinally therein, and a pin carried by the bearing and extending into the helical groove of the rod.

In testimony whereof, I hereunto affix my signature.

FRANK P. RYDER.